United States Patent [19]

Ishizuka et al.

[11] 4,187,479
[45] Feb. 5, 1980

[54] VARIABLE EQUALIZER

[75] Inventors: Kohei Ishizuka, Hachioji; Yoshitaka Takasaki, Tokorozawa; Yasuhiro Kita, Hachioji; Yoshinori Nagoya, Yokohama; Takeo Kusama, Chigasaki, all of Japan

[73] Assignee: Hitachi, Ltd., Japan

[21] Appl. No.: 860,098

[22] Filed: Dec. 13, 1977

[30] Foreign Application Priority Data

Dec. 22, 1976 [JP] Japan ............................ 51/153377

[51] Int. Cl.² .................................................. H03H 7/14
[52] U.S. Cl. ........................................ 333/28 R; 330/107; 330/304
[58] Field of Search ................... 330/107, 109, 304; 333/28 R, 80 R; 307/358, 359

[56] References Cited

U.S. PATENT DOCUMENTS

| | | | |
|---|---|---|---|
| 3,446,996 | 5/1969 | Toffler | 333/28 R X |
| 3,646,464 | 2/1972 | Boggs | 330/109 X |
| 3,753,140 | 8/1973 | Feistel | 333/28 R X |
| 3,906,390 | 9/1975 | Rollett | 333/28 R X |
| 4,063,187 | 12/1977 | Orchard | 333/28 R X |

Primary Examiner—Paul L. Gensler
Attorney, Agent, or Firm—Craig and Antonelli

[57] ABSTRACT

A variable equalizer is provided which, using a single variable resistor, can make compensations in both the directions of the gain side, and the loss side and can set a reference gain as desired.

An input signal to be equalized is received as an antiphase input signal of a differential amplifier, an output signal which has been equalized is fed back to the antiphase input signal, and a difference signal between an in-phase input signal and the antiphase input signal is delivered as an output. A resistor is connected between an input terminal and ground, first and second impedance circuits and a variable resistor are connected between an intermediate point of the first-mentioned resistor and ground in the order mentioned, and a voltage at the junction point between the first and second impedance circuits is used as the in-phase input signal.

6 Claims, 8 Drawing Figures

VARIABLE EQUALIZER

LIST OF PRIOR ART (37 CFR 1.56(a))

The following reference is cited to show the state of the art:

IEEE TRANSACTIONS ON CIRCUITS AND SYSTEMS, Vol. CAS-22, No. 8, August 1975, pp. 688-691, "Minimally Active RC Variable Equalizers" FRANC BRGLEZ.

BACKGROUND OF THE INVENTION (1) Field of the Invention:

This invention relates to a variable equalizer. More particularly, it relates to a variable equalizer which can vary the frequency characteristic of a transmission line for communication and which is incorporated into the transmission line in order to compensate for a change in the frequency characteristic.

(2) Description of the Prior Art:

In a wire communication system employing a coaxial cable, a pair cable or the like, the transmission characteristic of the cable fluctuates in dependence on the length of the transmission distance, a change in the ambient temperature, etc. It is therefore necessary to compensate for the fluctuations with a repeater, a receiver or the like.

Types of equalizers for making these compensations includes frequency equalizers which are determined by the characteristic inherent to a transmission line, and equalizers which compensate for the fluctuations of the characteristic inherent to the line as they occur due to changes in the ambient conditions of temperature etc.

The characteristics, i.e., gains of such equalizers for compensating for the characteristic fluctuations due to the changes of the ambient conditions are represented, when broadly classified, by a function of $(XY+1)/(X+Y)$ and a function of $(X-Y)/(X+Y)$. Here, X denotes a variable resistance value, and Y denotes an impedance which fluctuates in dependence on the frequency characteristic. In the former equalizer, the variable range of the variable resistance must cover from zero to infinity, which is inconvenient in constructing a circuit device. In contrast, in the latter equalizer, the variable range of the variable resistance may be from $-R$ to $+R$. Such an equalizer has the advantage that the variable resistance can be constructed of a field-effect transistor (FET) or similar device.

As an equalizer belonging to the latter type, there has heretofore been proposed an effective variable equalizer which employs a single variable resistance and a single operational amplifier, and which employs neither an inductor nor a negative resistance (see IEEE TRANSACTIONS ON CIRCUITS AND SYSTEMS, VOL. CAS-22, No. 8, AUGUST 1975, "Minimally Active RC Variable Equalizers," FRANC BRGLEZ).

The known equalizer, however, is so constructed that two circuits (on the gain side and on the loss side) are changed-over by a switch in order to vary the frequency characteristic symmetrically with respect to a reference characteristic. This leads to the disadvantage that the construction and use of a device is inconvenient.

SUMMARY OF THE INVENTION

An object of this invention is to improve the known active equalizer referred to above, and to provide an active variable equalizer which can vary the frequency characteristic in both the directions of the gain side and the loss side, i.e., symmetrically with respect to a reference gain, within a certain range of resistance values of a variable resistor and without employing any switching means.

Another object of this invention is to provide a variable equalizer whose reference gain can be set as desired, in other words, a variable equalizer whose gain in the case where the compensations for changes in the ambient conditions are unnecessary can be set, not only at 0 dB, but also at an arbitrary value.

This invention for accomplishing the objects is characterized by comprising a differential amplifier which receives as its antiphase input an input signal applied to an input terminal of the equalizer, which feeds an output signal thereof back to the antiphase input signal, and which delivers the difference between the in-phase input signal and the antiphase input signal as an output signal of the equalizer; series-connected first and second resistors, i.e., a voltage divider, one end of which is connected to either an output terminal or the input terminal of the equalizer and the other end of which is grounded; a first impedance circuit, a second impedance circuit and a variable resistor which are connected in series between the junction point of the first and second resistors and ground; and means to apply a voltage generated at the junction point of the first and second impedance circuits to the differential amplifier as the in-phase input thereof.

The above-mentioned and other objects and features of this invention will become more apparent from the following description taken in conjunction with the accompanying drawings.

DESCRIPTION OF THE PREFERRED EMBODIMENTS

Before the description of the embodiments of this invention, prior-art variable equalizers and the characteristics thereof will be explained in order to facilitate understanding of this invention.

Figure 1:
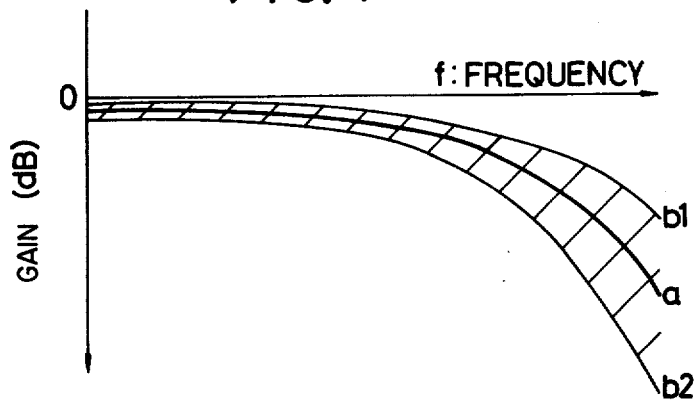
FIG. 1 shows the transmission characteristics or frequency characteristics of a transmission line.

FIG. 1 is a diagram of the frequency characteristics of a transmission line, in which the axis of ordinates represents the loss and the axis of abscissas represents the frequency.

In general, the loss increases with the increase of the frequency as illustrated by a curve a. Also the loss is generally substantially proportional to f. This characteristic is fixedly determined by the sort, length etc. of the transmission line, but it fluctuates upwards and downwards ($b_1$-$b_2$) with respect to the curve a due to temperature changes etc. in the surroundings. In a repeater, accordingly, the losses must be compensated for so that the characteristic may become flat over a service frequency band. Equalizers function to make such loss compensations. The frequency characteristic inherent to the line as indicated by the curve a is compensated for by a frequency equalizer. The fluctuations of the characteristic due to the changes of the ambient conditions (the fluctuations in the range of $b_1$ - $b_2$) are compensated for by the use of a separate variable equalizer exclusive therefor. This invention consists in the equalizer for compensating for the fluctuations of the characteristic due to the changes of the ambient conditions.

Figure 2A:
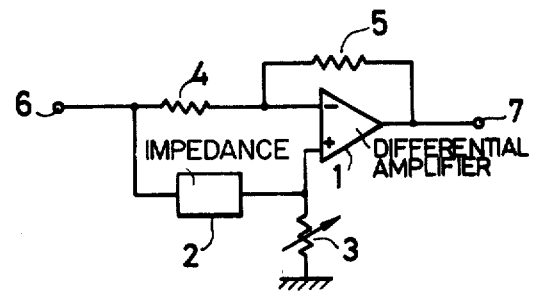
FIGS. 2A and 2B are circuit diagrams of prior-art variable equalizers.
Figure 2B:
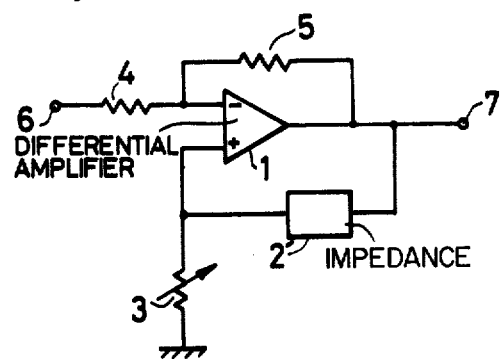

FIGS. 2A and 2B are circuit diagrams showing the arrangements of known variable equalizers which this invention intends to improve (for details, refer to the aforecited literature, IEEE TRANSACTIONS ON CIRCUITS AND SYSTEMS, Vol. CAS-22, No. 8, August 1975, pp. 688–691).

The variable equalizer shown in FIG. 2A consists of a differential amplifier 1 whose gain is of infinity, an impedance circuit 2 whose impedance varies in dependence on the frequency (the impedance being denoted by Z), a variable resistor 3 (whose resistance is denoted by $R_x$), and fixed resistances 4 and 5 whose resistance values are equal. The gain of the variable equalizer is expressed by:

$$\frac{V_o}{V_i} = -\frac{Z - R_x}{Z + R_x} \quad (1)$$

where $v_i$ denotes an input voltage, and $v_o$ an output voltage.

This variable equalizer has the advantage that the circuit arrangement is comparatively simple. Since, however, the resistance value becomes $R_x > 0$ in constructing the element, the equalization characteristic is varied only onto the loss side as indicated by a curve d in FIG. 3.

The variable equalizer shown in FIG. 2B is such that the impedance circuit 2, which is equivalent to impedance circuit 2 in FIG. 2A is connected on the output side (between an output terminal 7 and the variable resistor 3). The other components and the arrangement thereof are identical to those of the same reference numerals in FIG. 2A.

The gain of this variable equalizer of FIG. 2B is expressed by:

$$\frac{v_o}{v_i} = -\frac{Z + R_x}{Z - R_x} \quad (2)$$

Figure 3:
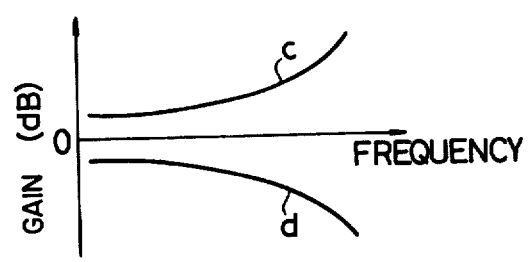
FIG. 3 is a frequency characteristic diagram showing the compensation characteristics of the prior-art variable equalizers.

The variable equalization characteristic is accordingly varied only onto the gain side (upper side) as indicated by a curve c in FIG. 3.

In actuality, the equalization characteristic needs to be varied on both the upper and lower sides symmetrically with respect to a reference gain, i.e., a straight line of the gain 0 (zero). Therefore, a change-over switch is provided, and the two circuits described above are changed-over. Unfavorably, however, the variable equalizer device in which the change-over is done with the switching circuit in the case of the automatic control thereof becomes complicated in the circuit arrangement.

Figure 4:
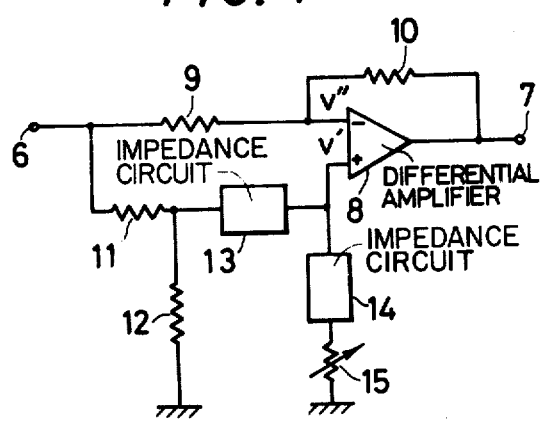
FIGS. 4 and 5 are circuit diagrams respectively showing first and second embodiments of the variable equalizer according to this invention, and FIGS. 6 and 7 respectively show a schematic diagram of of the variable equalizer shown in FIG. 5, and measured results of the frequency characteristic thereof.

FIG. 4 is a circuit diagram showing the construction of a first embodiment of the variable equalizer according to this invention. This variable equalizer comprises a differential amplifier 8 whose antiphase input (having a voltage $v''$) is an input signal (having a voltage value of $v_i$) applied to an input terminal 6 of the variable equalizer, which feeds an output signal (having a voltage of $v_o$) thereof back to the antiphase input signal, and which delivers the difference between the in-phase input signal and the antiphase input signal as an output signal of the variable equalizer. The circuit includes series-connected first and second resistors 11 and 12 (respective resistance values being denoted by $\beta R$ and $\gamma R$) one end of which is connected to the input terminal 6 of the variable equalizer and the other end of which is grounded. First and second impedance circuits 13 and 14 (whose impedance values are kZ and Z respectively, k being a constant) and a variable resistor 15 (whose resistance value is $R_x$) are connected in series between the junction point of the first and second resistors and ground in the order mentioned. In addition, means are provided for applying a voltage generated at the junction point of the first and second impedance circuits to the differential amplifier 8 as the in-phase input thereof.

Thus, the voltage $v'$ applied as the in-phase input becomes:

$$v' = \frac{\gamma (Z + R_x)}{(K + 1)(\beta + \gamma) Z + (\beta + \gamma) R_x + \beta \gamma R} \cdot v_i \quad (3)$$

The signal $v''$ bestowed on the antiphase input of the differential amplifier 8 becomes, letting r denote the resistance value of a resistor 9 and $\alpha r$ ($\alpha$ being a coefficient) denote the resistance value of a resistor 10, as follows:

$$v'' = (\alpha v_i + v_o)/(\alpha + 1) \quad (4)$$

Accordingly, the signal voltage produced at the output terminal 7 of the variable equalizer becomes, letting G denote the gain of the differential amplifier 8, as follows:

$$v_o = G(v' - v'') \quad (5)$$

By substituting Eqs. (3) and (4) into Eq. (5) and assuming the gain G of the differential amplifier 8 to be infinite, $$\frac{v_o}{v_i} = -\frac{\{\alpha K (\beta + \gamma) + \alpha \beta - \gamma\} Z + (\alpha \beta - \gamma) R_x + \alpha \beta \gamma R}{(K + 1)(\beta + \gamma) Z + (\beta + \gamma) R_x + \beta \gamma R} \quad (6)$$

Eq. (6) can be rewritten as follows:

$$\frac{v_o}{v_i} = -\alpha \cdot \frac{K}{K + 2} \cdot \frac{(K + 1)(Z + R) - (R_x - R)}{(K + 1)(Z + R) + (R_x - R)} \quad (7)$$

where $$\beta = \frac{1 + \alpha}{\alpha} \cdot \frac{K(K + 2)}{2(K + 1)} \quad (8)$$

$$\gamma = \frac{K(K + 2)(1 + \alpha)}{K + 2 - \alpha K} \quad (9)$$

By setting the coefficients $\beta$ and $\gamma$ with the conditions of Eqs. (8) and (9), there can be obtained a variable equalizer which can vary the frequency characteristic onto both the gain side and the loss side by varying the value of the variable resistor 15 in a range of $0 < R_x < 2R$ without employing any change-over switch as apparent from Eq. (7). Moreover, since α and K can be set as desired, the reference gain can be arbitrarily set. As apparent from Eq. (9), when K is selected to be equal to 2/(α−1), the resistance value of the resistor 12 becomes infinity, and the circuit can be constructed without the resistor 12.

Figure 5:
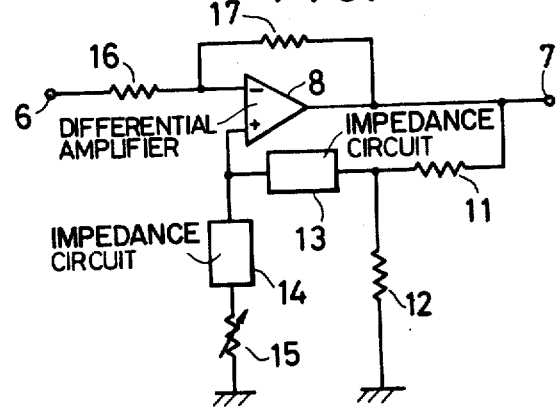

FIG. 5 is a circuit diagram of another embodiment of the variable equalizer according to this invention. The difference of this embodiment from the circuit illustrated in FIG. 4 is that the resistor 11 is connected to the output terminal 7. It will now be explained that this circuit has a property as the variable equalizer.

Letting αr denote the resistance value of a resistor 16 and r denote the resistance value of a resistor 17 (α being a coefficient), the same calculations as in the case of the circuit in FIG. 4 are conducted. Then, $$\frac{v_o}{v_i} = -\frac{1}{\alpha} \cdot \frac{K+2}{K} \cdot \frac{(K+1)(Z+R)+(R_x-R)}{(K+1)(Z+R)-(R_x-R)} \quad (10)$$

where $$\beta = \frac{1+\alpha}{\alpha} \cdot \frac{K(K+2)}{2(K+1)} \quad (11)$$

$$\gamma = \frac{K(K+2)(1+\alpha)}{K+2-\alpha K} \quad (12)$$

As apparent from Eq. (7) and Eq. (10), the two equations differ merely in that the numerator and the denominator are replaced with each other. Accordingly, as is the case in the circuit of FIG. 4, the circuit of FIG. 5 can realize a variable equalizer which can vary the characteristic both onto the gain side and onto the loss side and whose reference gain can be arbitrarily set. Also in the case of FIG. 5, by selecting K to be equal to 2/(α−1), the circuit operates without connecting the resistor 12.

Figure 6:
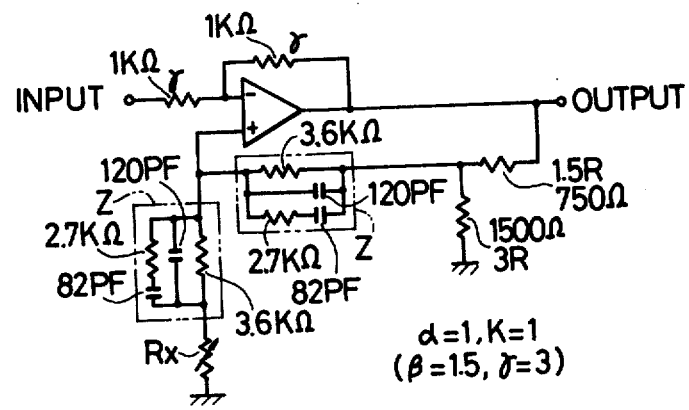
Figure 7:
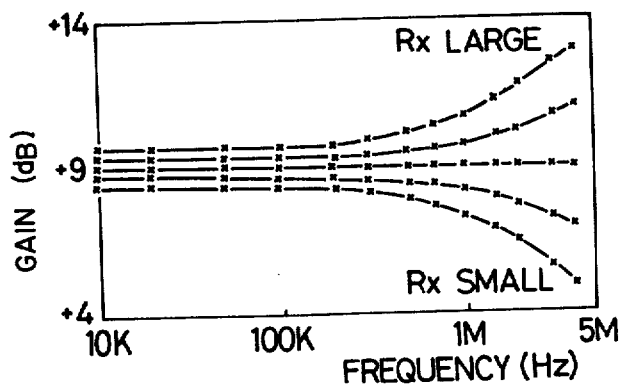

FIGS. 6 and 7 are, respectively, a circuit diagram of a specific equalizer constructed on the basis of the arrangement of FIG. 5 5 and a diagram showing the measured results of the frequency characteristics of the equalizer. In the present embodiment, the values of the impedances of the various constituent elements are set as follows:

| Resistsance element | |
|---|---|
| " | 16: αr = 1 KΩ, α = 1 |
| " | 17: r = 1 KΩ |
| " | 11: βR = 750 Ω, β = 1.5 |
| " | 12: ΓR = 1,500 Ω, Γ = 3 |

Variable range of the resistance $R_x$ of the variable resistor 15: 500Ω ≤ $R_x$ ≤ 1 KΩ

The first and second impedance circuits 13 and 14 are parallel circuits consisting of a resistor of 2.7 KΩ and a capacitance element of 82 pF and consisting of a resistor of 3.6 KΩ and a capacitance element of 120 pF, respectively. Accordingly, the impedance ratio K between the first impedance circuit 13 and the second impedance circuit 14 becomes 1 (one).

As seen from FIG. 7, in a case where the resistance $R_x$ is varied in the range of 500 to 1,000Ω, ideal compensation frequency characteristics are attained. The reference gain, that is, the gain which is constant over the entire frequency band and which is indicated in the middle of the characteristic curves is set at 9 dB.

We claim:

1. In a variable equalizer comprising:
   a differential amplifier which has a first anti-phase input terminal, a second in-phase input terminal, and an output terminal forming the output terminal of the variable equalizer;
   a first circuit which applies a voltage of an input signal to-be-equalized which is applied to an input terminal of said variable equalizer to the first anti-phase input terminal of the differential amplifier, said first circuit including a first resistance element which is connected between said input terminal of said variable equalizer and said first anti-phase input terminal, and a second resistance element which is connected between said output terminal of said variable equalizer and said first anti-phase input terminal; and
   a second circuit which applies a voltage of said input signal to-be-equalized which is applied to said input terminal of said variable equalizer to the second in-phase input terminal of the differential amplifier, said second circuit including a voltage divider having a voltage dividing terminal, one end of which voltage divider is connected to one of said input terminal and said output terminal of said variable equalizer and the other end of which is grounded, and first and second impedance circuits and a variable resistor which are connected in series between said voltage dividing terminal and ground with the first impedance circuit connected to said voltage dividing terminal, the second impedance circuit connected to the first impedance circuit, and the variable resistor connected between the second impedance circuit and ground, wherein a junction point between said first and second impedance circuits is connected to said second in-phase input terminal of said differential amplifier.

2. A variable equalizer according to claim 1, wherein the first resistor and the second resistor of said first circuit have equal resistances.

3. A variable equalizer according to claim 1, wherein said first and second impedance circuits of said second circuit are identical in construction.

4. A variable equalizer according to claim 1, wherein said voltage divider is constructed of resistors.

5. A variable equalizer according to claim 1, wherein letting α denote a resistance ratio between the second resistor and the first resistor of said first circuit, βR and γR denote resistance values of a third resistor and a fourth resistor which constitute said voltage divider, and KZ and Z denote impedances of said first and second impedance circuits, a variable range of said variable resistor is made from zero to 2R, and β and γ have the following relations:

$$\beta = \frac{1+\alpha}{\alpha} \cdot \frac{K(K+2)}{2(K+1)}$$

$$\gamma = \frac{K(K+2)(1+\alpha)}{K+2-\alpha K}.$$

6. A variable equalizer according to claim 5, wherein the constants K and α have a relation of K=2/α−1, and the resistance between said voltage dividing terminal of said voltage divider and ground in said second circuit is made infinity so that said voltage dividing terminal and ground are cut off.

* * * * *